US008631977B2

(12) United States Patent
Feierabend et al.

(10) Patent No.: US 8,631,977 B2
(45) Date of Patent: Jan. 21, 2014

(54) CLOSURE FOR A CONTAINER

(75) Inventors: Jens Feierabend, Weener (DE); Michael Schipper, Weener (DE)

(73) Assignee: Weener Plastik GmbH, Weener (DE)

( * ) Notice: Subject to any disclaimer, the term of this patent is extended or adjusted under 35 U.S.C. 154(b) by 266 days.

(21) Appl. No.: 12/792,339

(22) Filed: Jun. 2, 2010

(65) Prior Publication Data

US 2011/0132926 A1    Jun. 9, 2011

Related U.S. Application Data

(60) Provisional application No. 61/183,302, filed on Jun. 2, 2009.

(51) Int. Cl.
*B65D 47/00* (2006.01)
*B65D 43/12* (2006.01)
*B65D 43/20* (2006.01)
*B67D 3/00* (2006.01)
*B67D 1/08* (2006.01)

(52) U.S. Cl.
USPC ........... 222/559; 222/149; 222/544; 222/563; 220/345.1; 220/345.2

(58) Field of Classification Search
USPC ................. 222/390, 559, 149, 563, 544, 545; 220/345.1–345.4, 351, 252; 215/322
See application file for complete search history.

(56) References Cited

U.S. PATENT DOCUMENTS

| 1,543,097 | A | * | 6/1925 | Canton | 222/511 |
| 2,251,392 | A | * | 8/1941 | Bernhardt | 222/511 |
| 2,652,177 | A | * | 9/1953 | Lagemann | 222/509 |
| 2,751,130 | A | * | 6/1956 | Murphy | 222/509 |
| 3,146,913 | A | * | 9/1964 | Kiyoshi Nagai | 222/110 |
| 3,174,661 | A | * | 3/1965 | Speicher | 222/545 |
| 5,016,786 | A | * | 5/1991 | Horino et al. | 222/504 |
| 5,054,634 | A | * | 10/1991 | Margotteau | 215/322 |
| 5,915,577 | A | | 6/1999 | Levine | |
| 5,975,369 | A | * | 11/1999 | Yurkewicz et al. | 222/153.06 |
| 6,112,953 | A | * | 9/2000 | Gueret | 222/494 |
| 6,299,036 | B1 | * | 10/2001 | Fuchs | 222/509 |
| 6,439,442 | B1 | * | 8/2002 | Markert et al. | 222/547 |
| 7,048,155 | B2 | * | 5/2006 | Kuwahara et al. | 222/321.9 |
| 7,066,360 | B2 | * | 6/2006 | Hearld et al. | 222/525 |
| 7,766,178 | B2 | | 8/2010 | Robinson et al. | |
| 2009/0008392 | A1 | | 1/2009 | de Cleir | |
| 2011/0120998 | A1 | | 5/2011 | Brauer | |

FOREIGN PATENT DOCUMENTS

AU    B-57653/90    1/1991
DE    40 20 371 C1    6/1990

* cited by examiner

*Primary Examiner* — Kevin P Shaver
*Assistant Examiner* — Matthew Lembo
(74) *Attorney, Agent, or Firm* — Hamilton, Brook, Smith & Reynolds, P.C.

(57) ABSTRACT

The present invention relates to a closure for a container, in particular for a fluid product, with a first part having an outlet opening, and with a second part having a carrier section, which carries a closing surface, wherein said first part and said second part are arranged movably against each other at least between a first position and a second position, and wherein, in said first position, said outlet opening is closed by said closing surface, while, in said second position, the outlet opening is open, wherein the first part confines a first cavity, through which the product can be transferred out of the container to the outlet opening and said carrier section, in said second position, is arranged at least partially within said first cavity. The present invention relates to a method for manufacturing said closure.

15 Claims, 10 Drawing Sheets

US 8,631,977 B2

CLOSURE FOR A CONTAINER

RELATED APPLICATION

This application claims the benefit of U.S. Provisional Application No. 61/183,302, filed on Jun. 2, 2009. The entire teachings of the above application are incorporated herein by reference.

DESCRIPTION

The present invention relates to a closure for a container, in particular for fluid product, a manufacturing method for such a closure and containers provided with such a closure.

Such closures are used for the closing of containers, which can contain a fluid product, in particular a liquid, paste-like or powder-like product. Application of such closures takes place, in particular, in the food industry, the cosmetics industry, the pharmaceutical industry, the hygiene article industry, the cleaning article industry or the chemical industry.

Closures of the afore-mentioned type are often realized as simple flip-tops or two-part screw tops. Said closures have the disadvantage that external objects, in the open state of the closure, can easily contaminate such sections of the lid element, which, in the closed state, serve to cover or to block the outlet opening of the closure. In the case of the flip-top in its opened state, a closing surface and, if provided, a sealing plug extend far into the environment. In the case of the screw top, the closing surface and, if provided, a sealing plug are even more exposed to the environment, due to the structural separation of the lid from the lower part, such that a contamination of these sections is even more likely. Said contaminated sections, in the closed state of the closure, are connected with the container inside or, respectively, with the first cavity of the closure being connected with the container inside. The product is exposed to said contaminants, namely, during the whole time of storage of the container between the short phases of use, for example, such that with increasing duration of the storage a contamination of the product by the contaminants becomes more likely.

Advanced closures are those, in particular, which are often referred to as "disc-top" closures. In the case of these closures, which are relatively elaborately to produce, a tube element is pivotably arranged at the outlet opening of a closure lower part, wherein, after pivoting open of the tube element into an open position, the product can flow through the tube element. After pivoting-in of the tube element, no product can pass through the tube element, whereby the closure is closed. Moreover, in the pivoted state, the tube element is arranged countersunk in a cavity, which is formed by the outer casing wall of the lower part of the closure, whereby the problem of contamination is reduced.

It is the object of the present invention to create a closure, which reliably protects the product against contamination and which, in particular, can be produced at a reasonable price.

Said object is met by the present invention by the closure according to claim 1, a container provided with the closure and the method of production of the closure. Preferred embodiments of the closure are subject matters of the dependent claims.

The closure for a container according to the invention, in particular for a fluid product, comprises a first part having an outlet opening, and a second part having a carrier section, which carries a closing surface, wherein said first part and said second part are arranged movably against each other at least between a first position and a second position, and wherein, in said first position, said outlet opening is closed by said closing surface, while, in said second position, the outlet opening is open, wherein the first part confines a first cavity, through which the product can be transferred out of the container to the outlet opening and said carrier section, in said second position, is arranged at least partially within said first cavity.

Said first part of the closure, preferably, is formed as lower part of the closure and, preferably, is arrangeable above an opening of the container. The first part, preferably, is a hollow cylinder-like component.

Said second part, preferably, is formed as upper part of the closure and, preferably, is, at least partially, arrangeable above a lower part. However, it is also possible and preferred that said second part is formed as a side part and is arrangeable, at least partially, at the side of said first part.

Within the scope of this description and as far as nothing else arises from the context, the directions above, below and at the side relate, preferably, to a reference system, wherein the container opening to be sealed lies in a horizontal plane and is open upwards, which means, preferably, in the direction opposite to the direction of gravity. The term "inside", preferably, refers to the inside of the container or closure, at hand, while the term "outside", preferably, relates to the surroundings of the closure and the container.

The closure, in particular said first part, preferably, comprises a fastening device, by means of which the first part can be connected with the container, in particular with a container neck. Preferably, the first part has a hollow-cylinder section, which, preferably, at its inner side carries an internal thread, which is formed for use with the outside thread of a container neck. Instead of a thread, said fastening device can also comprise catch means, e.g., a circumferential inner rim at the inner side of the hollow-cylinder-like section of the first part, wherein the inner rim can be engaged by the outer catch cams arranged on the outer side of a container neck, such that said first part can be connected with the container by snap-on. The fastening device, further, can comprise connecting means in the way of a bayonet joint.

Moreover, said first part, preferably, comprises at least one seal means, by which a tight connection of the first part with the container is achieved. The seal means, preferably, are adapted such that the quality of the sealing is appropriate to prevent the unintended leakage of the product from a container, which is closed by means of the closure according to the invention. The quality of the sealing, preferably, is adapted to the quality of the product, which, in particular, is fluid, e.g., is liquid, paste-like or powder-like. The seal means, preferably, are formed integrally with said first part. However, it is also possible that said seal means are separate elements, e.g., elastic O-rings, which are added to the first part. The seal means, preferably, comprise a sealing lip arranged circumferentially around the outlet opening of the first part. Said sealing lip, preferably, is configured to be elastically bendable and, preferably, formed integrally with the first part and, preferably, upon connecting of said first part with the container or the container neck, the sealing lip is pressed against said container or container neck, wherein the sealing lip is elastically deformed, which achieves the seal effect.

The first part and the second part, preferably, are components, which are produced separately and then, in a delivery state of the closure, are assembled relative to each other. Preferably, the closure comprises a holding device, by means of which the first and the second part are held undetachably to one another. For the configuration of such an undetachable connection, the first part and the second part, preferably, are configured such that they can be connected without being damaged for establishing the delivery state, e.g. by snapping-on, while they do not detach from each other during the intended use. For that purpose, the holding device, preferably, comprises catch means, e.g., a catch groove at the first part and a catch tongue at the second part. However, it is also possible that other parts of the closure, or respectively, of the first and the second part, serve to form said holding device.

It is also possible and preferred that the first and the second part are connected inseparably such that their separation is impossible without destructing sections of the closure. In said state, the first and the second part, preferably, are moveable against each other or, preferably, are not moveable against each other.

Preferably, the closure has a tamper evident device, which indicates the original state of a closed closure to the user. For that purpose, a tear band can be fastened, e.g., at the second part, via predetermined breaking points, the tear band comprising an opening, which, in the closed state of the closure (the first position), is engaged by a projection, which is integrally formed with the first part, preferably. Then, a conversion of the closure to assume said second position is only possible if said predetermined breaking points are destroyed, which signals the lack of originality of the closure to the user.

The closure, preferably, is formed as a sliding closure, or, preferably, as a flip-top closure, and, preferably, as a screw-top closure. The first part and the second part, preferably, can be moved at least, in particular exclusively, translatingly and/or rotatory against each other. In particular, in the case of a sliding closure, the closure is operable especially comfortably and attractively, in particular, one-hand operable.

The closure, preferably, comprises a guiding device, by which the first part and the second part are guided, while they are moved relative to each other between the first and second position. Preferably, the first and the second part are held together by means of said guiding device.

Preferably, the closure comprises a positioning device, by means of which the second part is held at the first part detachably, or, preferably, undetachably, or, preferably, substantially undetachably, in a predetermined position. For that purpose, the positioning device has catch means, preferably. In particular, said positioning device has a projection section, which, for example, can be arranged at the first part to form a resistance for the relative motion of the first and second part at a predetermined position, which can be overcome by the user action. In particular, said second part can have a second projection section, which hits the first projection section during the relative motion of the first and second part. Further, the positioning device can have magnets or magnetic areas, which, for example, are connected with said closing surface or with said first or second part. To overcome such a position, which is predetermined by the positioning device, the user has to provide an opening force, which also signals him the corresponding position of the closure. That way, the manageability of the closure is improved. Preferably, the closure can be positioned in said first position, or, respectively preferred, in said second position, by means of said positioning device.

The second part, preferably, is formed as a sliding part, by providing, in particular, guiding sections, which are assigned to said guiding device. However, the second part can also be formed as a flipping part, which is arranged pivotably at the first part. In this case, the closure, preferably, comprises a hinge section, which pivotably connects said first and said second part. Further, it is possible and preferred that this second part is formed as a rotating part and is arranged detachably or undetachably and pivotably at said first part.

For that purpose, in particular a rotation guiding device can be provided, in particular a thread device or a bayonet joint device.

This guiding device or said rotation guiding device, preferably, are formed such that said closing surface is guided, during the relative motion of said first and said second part, from said second position into said first position against the outlet opening such that the latter is closed.

The first part, preferably, further has a first cavity, which confines the first part, in particular outwards, through which the product can be transferred out of the container to the outlet opening, if the first part is arranged at the container. Said first cavity, here, can be identified to be that inside volume of the first part, through which, in the state of the closure being attached to the container, the product can advance out of the container, e.g., out of the container neck, from the container opening through said volume through to the outlet opening of the first part.

The first part, preferably, is formed such that said first cavity has a volume as small as possible. Thereby it can be achieved that a product volume as small as possible is located in the outlet path of the closure. That way, in particular, less such product will flow back into the container inside or, possibly, be sucked back, which product has already suffered a certain environmental exposition near the outlet opening and is already affected, e.g., by the influence of environmental oxygen or other substances. The storage of the product is improved that way.

Thereby, the lower limit for the size of said first cavity, preferably, is predetermined by the requirement that the passage of the product should not be retarded by said first cavity and by said outlet opening in an undesired manner. Assuming a closure being arranged at a container, the volume of said first cavity, preferably, is smaller than the cross section of the outlet opening multiplied by the smallest distance between the outlet opening and the container opening, or, preferably, smaller than the cross section of the outlet opening multiplied by the distance of the centre of the external border of the outlet opening and the centre of the external border of the container opening, or, preferably, smaller than the volume of the thought envelope surface (surface function) of the first part, in the first position, multiplied by any of the factors ½, ⅓, ¼, ⅕, ⅙, ⅛, ¹⁄₁₀. However, it is also possible and preferred that said first cavity comprises another volume, in particular, a larger volume.

Said first cavity, preferably, comprises a space section merging into the outlet opening, which, preferably, is confined by at least one wall section, in particular by an outer wall section of the first part. Preferably, the first part confines a space section, through which the product can be transferred from the container to the outlet opening, wherein the space section has an entry cross section and an outlet cross section, e.g., an entry opening and an outlet opening, and, preferably, the space section comprises an engagement cross section, e.g., an entry opening, for the engagement of the closing section or another component section into said space section.

The outlet opening, preferably, is an opening, or breakthrough, or a gap of an outer wall of the first part. In this second position, the outlet opening, preferably, is opened completely. In the completely opened position, no components are arranged within the outlet opening, in particular no components are arranged in the plane, which is defined by the external border of the outlet opening. That way, the whole cross section of the outlet opening is available for the discharge of the product. However, it is also possible and preferred that also in said second position a component, e.g., the carrier section, is arranged at least partially within the outlet opening, thus rendering the outlet opening partially opened. In consequence, only a part of the cross section of the outlet opening is available for discharging the product, while the other part of the cross section of the outlet opening is used by the engaging component, which, e.g., also can be an atomizer nozzle or a holding element.

The outlet opening of the first part, preferably, is arranged at least partially in a plane, which is inclined and/or, in particular, vertical, with respect to a direction of motion, along which the first and the second part are moved between the first and second position relative to each other. Preferably, the outlet opening is arranged in a side wall of the first part. Such a side wall can be formed vertically, inclined or curved, with respect to a direction of motion. Preferably, said outlet opening is arranged at the first part such that, in the case of an upright standing container provided with said closure, said outlet opening is arranged vertically.

The outlet opening, preferably, is arranged at the first part such that the normal of the outlet opening is preferably arranged exactly or, respectively, substantially, vertically to the gravitation vector and, further preferred, is arranged in an angle from less than, or equal to, in each case preferably, 180°, 135°, 90°, 45°, 30°, 20°, 15° or 5° with respect to the gravitation vector. Preferably, e.g., in the case that the closure is formed as a sliding closure, at which said first part and said second part can be moved translationally in relation to each other, said outlet opening is arranged vertically with respect to said direction of motion. The normal of the outlet opening is defined to be the normal of the plane, which runs substantially parallel to the plane of the outlet opening, or substantially parallel to the plane of the external, middle or internal border of the outlet opening.

Such a configuration offers the advantage that in at least one position of the closure, in particular at least in said first and said second position of the closure, few or not any contaminating substances, e.g., dirt particles or water drops, can fall in the outlet opening by gravitation, if the container provided with the closure is stored conventionally on a horizontal surface. In this situation of the container and of the closure according to the invention in one of the described embodiments, in which the outlet opening is not arranged, in particular, completely vertically with respect to the direction of gravitation and, preferably, is arranged parallel to the direction of gravitation, the advantage is offered that such a closure allows a very reliable protection of the product. Further, in the case of a lateral arranged outlet opening, it is possible to laterally move the closing section in the direction of the outlet opening, which favours the embodiment as a sliding closure, in particular.

However, it is also possible and preferred that the outlet opening is arranged horizontally and, e.g., at an upper side of the first part. Preferably, said outlet opening comprises a cross section whose shape can be circular, ellipsoidal, triangular, quadrangular, pentagonal, hexagonal, multigonal or is star-shaped, or comprises straight sections and/or curved sections or a combination of said shapes. The outlet opening, preferably, is configured such that the outlet opening or a border of the first part limiting the outlet opening lies completely in a (planar) plane. The outlet opening, preferably, can be formed also in such a way that outlet opening or a border of the first part limiting the outlet opening do not, or do not completely, lie in a plane, by having them arranged, e.g., in a curved section.

It is possible and preferred that the closure has several outlet openings, which, for example, together form an outlet cross section.

The first part can have a mouth section, by means of which the first cavity, which is passed by the product advancing from the container to the outlet opening, is increased by, e.g., a hollow-cone-shaped wall of the first part, which protrudes outwards and opens into said outlet opening. Such a mouth section can be formed as a drinking nozzle. Preferably, the outlet opening of said mouth section points upwards or points at least partially aside. Preferably, said mouth section is arranged on a centre line through the first part or is arranged at the side of said centre line, e.g., at the lateral border of said first part.

In particular at the embodiment as a sliding closure, it is possible to provide the closure with an outlet channel for the product, said channel running along a vertical side wall section of the first part through the first cavity, in particular through said mouth section and through said outlet opening. For that purpose, the outlet opening and/or this mouth section, preferably, are arranged at the side of the centre line through the first part and are arranged near a vertical side wall of the first part. Such a closure can be combined with a container, whose container opening is arranged preferably at the side of the centre line through the container and near a vertical side wall of the container. In this case, the vertical wall of the first part and the vertical wall of the container, preferably, are aligned at each other. In particular for such a combination of container and bottle, a closable container is received, which can be realized as a drinking bottle, whose residual content, e.g., water, already largely discharges through the outlet opening, if the inclination angle of the vertical side wall exceeds the horizontal plane by a small angle of, e.g., smaller than 10, 5 or 2 degrees.

In contrast, in the case of closable containers having a closure arranged centrically, a residual volume exists between the head wall of the container and the side wall of the container, wherein the residual content is caught in the residual volume and can be discharged completely only by using larger inclination angles. Consequently, such a container, e.g., formed as a drinking bottle, must be tilted further for the complete discharging, which can be accompanied by a pronounced tilt of head, which can be felt to be uncomfortable and which can be particularly problematic in the case of containers for physically limited people, e.g., older people, babies, infants or children. Also in sport, e.g., in cycling, a lower inclination angle during discharging can be advantageous to keep free the field of view of the drinking sportsman or to maintain the aerodynamics.

It is also possible and preferred that the first part comprises an inwardly directed mouth area, which, e.g., is formed like a hollow cone and intrudes from an, e.g., lateral outer wall of the first part into the first cavity, and which, thus, comprises a "sunk-in" outlet opening. An external cavity, configured in this way, or, respectively, said sunk-in outlet opening, of the first part can serve to protect the outlet opening, or, in particular, said closing surface, which points outwards in said first position, preferably, against contamination.

Preferably, the closure comprises a shield element, which, preferably, is arranged at the first or second part, preferably above the outlet opening, preferably in every position of the closure, in particular in said first and/or said second position, in particular integrally formed with the first or second part, wherein the shield element, preferably, shields the outside section, preferably upwards, which is situated in front of the outlet opening, and, thus, protects the outlet opening and also the product against contamination.

A closing surface is a surface section of a component, e.g., of a carrier section. It encloses such surface sections, which, in the situation of a completely closed closure, contribute to the reduction to "zero" of the cross section of the outlet opening, in particular of the cross section defined by its external border, if the component carrying the closing surface, e.g., said carrier section, is thought away. Preferably, said closing surface confines said first cavity, in said second position, and, preferably, points outwards in said first position. However, it is also so possible and preferred for the arrangement of the closure that said closing surface is pulled against the outlet opening by the carrier section.

The second part has a carrier section which carries said closing surface. Said carrier section, preferably, has a closing plug, wherein the carrier section and/or the closing plug, preferably, are formed integrally with the second part. It is further possible and preferred that the carrier section and/or the closing plug are produced as separate components, which are connected with said second part in another production step. Said closing plug, preferably, has the same cross section like said carrier section, but, however, can also be formed differently.

The first part, preferably, comprises an engagement opening, into which said carrier section engages in said first position, preferably also in said second position. Said carrier section, preferably, in this second position, is arranged at least partially within a second cavity of the first part. The carrier section, preferably, is formed such that it extends at least in part symmetrically, with respect to a uniform path of motion, along which the first and the second part are moved between the first and the second position relative to each other. In the case of a translational movement of the second part at the first part along a line, the carrier section can be formed, e.g., like a hollow cylinder section, which is arranged symmetrically with respect to said line. In this case, the engagement opening, preferably, is formed to have a circular cross section, which corresponds to said hollow cylinder section, in order to allow the form-fit and sealing engagement of the same.

Preferably, said first part, in addition to the outlet opening, also has an engagement opening, which serves for the engagement of said carrier section, said closing plug or another component, which is assigned to the second part. Preferably, said engagement opening is sealed by said component (closing plug, carrier section), which is assigned to said second part, at least in said first position and in said second position, and, preferably, in all positions between said first and second position such that, in particular, a fluid, a liquid, a powder or a gel can not leak through said engagement opening in said positions. This is achieved, preferably, using appropriate material properties (e.g., by manufacturing all parts from PP) and the fitting of the carrier section into said engagement opening. The component, which is assigned to the second part and which engages said engagement opening of the first part, preferably sealingly, is formed for the form-fit engagement into said engagement opening, preferably. The cross section of said engagement opening can have one of those shapes, which are named in the description of the outlet opening.

The closure, further, can have guiding means for the guidance of said carrier section and/or closing plug in the first part and, possibly, for sealing the outlet channel. The first part, further, can provide a depression of an inner wall of the first part, in particular of the first cavity, in which depression said carrier section and/or closing plug engages form-fittingly and sealingly. Such a feature, in particular, allows to arrange the outlet opening at an upper side of the first part, in particular above the carrier section and/or the closing plug.

Preferably, said closing plug is a cylinder-like or hollow cylinder-like component, which can be guided, within said engagement opening, translationally in the direction towards said outlet opening of the first part such that said outlet opening is closed. Preferably, said carrier section engages said outlet opening in said first position. However, it is also possible and preferred that said carrier section and/or said closing plug is a curved component, respectively, which is rotatory guidable at the first part through that engagement opening and is moveable in the direction of the outlet opening such that the latter is sealable in said first position. It is further possible and preferred that said carrier section and/or said closing plug have a spiral-like shape such that it can be guided by looping motion, i.e. a mixed translational/rotational movement, through said engagement opening of said first part in the direction of the outlet opening such that said outlet opening of the first part is closeable in said first position.

However, it is also possible and preferred that said carrier section is not integrally formed or solidly fixed with the second part, which, preferably, causes the movement of said carrier section between said first and said second position. Further, it is possible that said carrier section and said second part are identical. For said embodiment of the closure, no engagement opening is necessary to be formed in the first part for the engagement of a closing plug, a carrier section or another component of the second part, and therefore, preferably, no engagement opening is provided. In this case, said first cavity of the first part has only one entry cross section, through which the product can enter the first cavity and has said outlet opening, through which the product can discharge. The carrier section is moved, in this embodiment, preferably, by an indirect mechanical coupling. Therefore, preferably, a side, e.g. The upper side of the first part, is formed as a deformable membrane, which confines the first cavity. At the second part, a projection element can be provided such that a movement of the second part at the first part leads to a deformation of said membrane, which moves the closing section/closing plug, which is arranged in the first cavity, between said first and said second position.

However, it is also possible and preferred that at least one magnet element is provided, which enables the movement of the closing surface between said first and said second position. Therefore, said closing surface and/or said carrier section, preferably, is provided with a magnetic area or a magnet. Said magnetic area or magnet, preferably, is moved by a magnetic section or magnet, which is arranged at the second part, by having the respective interacting magnetic parts of the closing surface/carrier section and of the second part being separated only by a thin membrane, preferably, which confines said first cavity of the first part, but which ensures that magnetic coupling force. Such a magnet can be a (un-)coated neodymium, samarium cobalt or ferrite magnet, while such a magnetic area can be made from ferromagnetic material, e.g. iron, in each case optionally encased or coated, which is helpful against corrosion and abrasion.

In the case of the embodiment, where said first part does not have an engagement opening for the carrier section, the advantage is achieved that a contamination of the inside of the first cavity or the container inside by contaminants invading through the engagement opening, which might occur in spite of the provision of sealing means, are prevented by abandonment of said engagement opening. This can be an advantage, in particular, in the case of damageable products or valuable products.

Preferably, the first part comprises guiding means, e.g., sliding rails or sliding protrusions, by means of which said carrier section and/or said closing surface can be guided within the first part. That way, the accuracy of the movement of the closing surface and, thereby, the reliability of the closure is improved.

Preferably, said carrier section is formed for the form-fitting engagement into said outlet opening. Preferably, said carrier section and/or said outlet opening is formed for the sealing engagement into said outlet opening, by having the outlet opening sealed by the engagement with respect to a fluid, a liquid, a powder or a gel close. Therefore, a preferably shape elastic sealing bead or a sealing lip, preferably, can be arranged integrally formed at the carrier section or at this outlet opening.

Said carrier section, and, preferably, said closing surface, is arranged at least partially within said first cavity, in said second position. That way, the carrier section, in said second position, is protected at least partially against contaminants and remains arranged at least near the closure or even within the closure which ensures a minimal exposure of the carrier element to the environment. Possible contaminants being dissolvable can be rinsed outwards, in this second position, by the effusing product with high probability such that the carrier section at least in part and, preferably, also said closing surface are cleaned.

It is possible and preferred that the carrier section, in this second position, is arranged at least partially outside of the outlet opening and that the closing surface is pulled from the outside against the outlet opening.

It is further possible and preferred that the closing surface, between the first position and the second position, is arranged at least partially within the first cavity. Starting from said position, which means from within the first cavity of the first part, and thus, eventually, starting from within the "container inside", said closing surface, in this case, is displaced for closing the outlet opening into said first position. Thus, the advantage can be achieved that, during the storing phase, in which the container is closed with the closure substantially for a longer period compared with the short opening phases, the closing surface, which, in this first position of the closure, is exposed at least partially to the environment, is not in connection with the inside of the first cavity or the container and, therefore, not in contact with the product. Thus, a contamination of the product during said storing phase can be excluded.

In a delivery state of the closure, the closure, preferably, is arranged in said first position. Nevertheless, it is further possible and preferred to provide the closure in such a delivery state, wherein said closing surface, between said first position and said second position, is arranged at least partially within said first cavity. Preferably, the outlet opening of the first part is sealed, in particular in a delivery state of the closure, with a sealing element, e.g., an aluminium or plastic foil. The latter is automatically destroyed or removed, preferably, before the first use of the closure by the consumer by hand or by conveying the closure into said first position or another position. Preferably, in particular such a closure comprises positioning means to inseparably, or substantially inseparably, position the closure, in particular in said first position. Such a closure allows to treat the product or the empty inside of the container to be particularly hygienically or sterilely such that application is possible in medical laboratories and other fields, which require maximum cleanness.

The second part, preferably, further comprises a lid section which, preferably, in said first position and/or said second position, covers the upper side of the first part at least partially upwards. Further, said lid section, preferably, is formed such that it covers the first cavity of the first part, and/or said second cavity upwards. This offers the advantage that the whole top side of the first part, in particular said second cavity of the first part, is shielded against dust or other impurities. In this manner an even more reliable protection of the container inside and the product is reached.

The first part, preferably, has a second cavity, which is opened outwards, preferably. Said second cavity offers space for other functionalities of the closure. Preferably, in at least one position between said first and said second position or said first or said second position, sections of the second part are arranged within said second cavity at least in part, in particular said closing plug, said carrier section or other components. Preferably, said guiding device is arranged at least partially within said second cavity of the first part or at the border of the second cavity of the first part. Preferably, said positioning device is arranged at least partially within said second cavity. In particular, said first part and said second part can have a stopper element, by which, in particular, said second position of the closure is determined. Preferably, in said second position, said second cavity is secluded from the environment by the second part to prevent contamination of the second cavity.

Said second cavity can be also connected with said first cavity or the container inside via at least one opening, which, preferably, is arranged in a maximum distance to the outlet opening. Preferably, the first part is formed such that it has a gap or opening, by means of which said second cavity is opened outwards towards the surroundings at least in said second position and is sealed, in said first position, preferably, by a section of the second part. In this manner, the closure can be provided with a vent device, which makes it easier to pour out the product through the outlet opening.

Preferably, the closure has a signalling device, which signals the change between said first and said second position to the user, in particular, by acoustically, visually or tactile perceptible signals. Preferably, said signalling device has a vibration element, which can be arranged at the first part, and an actuation element, which can be arranged at the second part, wherein the actuation element causes vibrations of the vibration element upon changing between said first and said second position, wherein said vibrations are senseable by the user acoustically, i.e. as a noise, and/or tactile, i.e., e.g., as perceived vibrations. That way, the manageability of the closure is improved.

Preferably, said closure is formed one-hand operable. In particular, a sliding closure, at which the second part is moveable translationally with respect to the first part, is one-hand operable.

The material of the closure, i.e. the material of the first part and the second part, preferably, is a plastic, which is suitable for injection moulding. Preferably, said material is polypropylene, but other materials are also possible and provided. The method according to the invention for producing the closure according to the invention, preferably, comprises the steps: Injection moulding of the first part; injection moulding of the second part; and joining this first and this second part, preferably by snap-on.

The closure according to the invention is used for sealing of containers, which can contain fluid, in particular liquid, paste-like, gaseous or powder-like products. The containers, which are provided with said closure, can be, in particular, bottles, tubes, bags, boxes, tubes, made from materials, which can comprise, in particular, plastics, e.g., polyethylene or polypropylene, glass, metal, e.g., aluminium, metal laminate, cardboard or paper laminate.

The application of the closure according to the invention is intended in particular in the food industry, the cosmetics industry, the pharmaceutical and medicine-technical industry, the sanitary article industry, the cleaning article industry or the chemical industry and in particular the application areas related to these industries.

Disposable vessels as well as reusable vessels can be provided with the closure according to the invention. The closure according to the invention, preferably, is formed as a disposable closure, in particular for the use with disposable vessels, and is configured, in particular, to be low-cost. However, it is also possible and preferred to configure the closure as a reusable closure. In this arrangement, the closure according to the invention is suited, in particular, for providers of recyclable containers, e.g., drinking bottles, for the use at recyclable containers.

BRIEF DESCRIPTION OF THE DRAWINGS

Other preferred embodiments and advantages of the closure according to the invention can be derived from the description of the embodiments and the figures. The same reference signs in the figures describe the same components, respectively, if not differently describe.

DETAILED DESCRIPTION OF THE INVENTION

Figure 1:
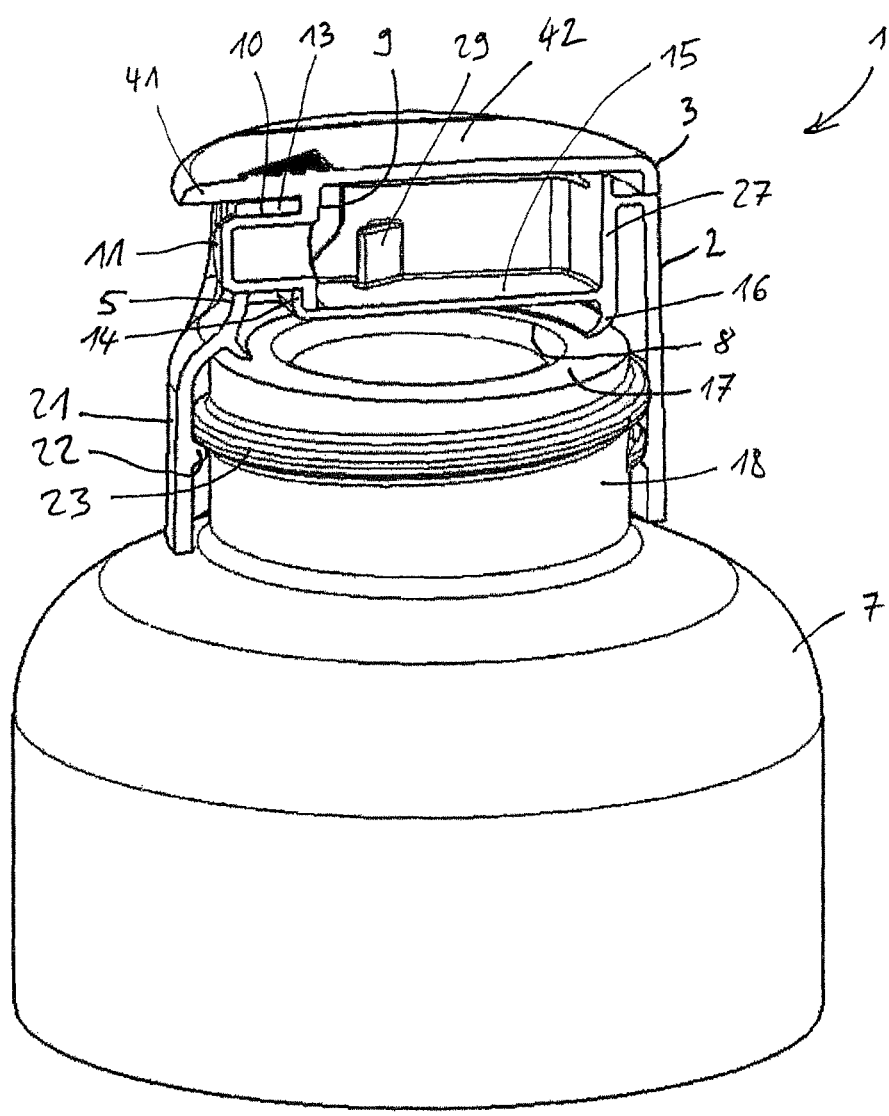
FIG. 1 is a perspective view of an embodiment of the closure according to the invention in said first position, wherein the closure is displayed cut open along a vertical symmetry plane running through the centre of the outlet opening.

In FIG. 1 half of the closure 1 is shown for a better illustration along a vertical symmetry plane through the centre of the closure and the centre of the outlet opening. The closure 1 comprises the first part 2 and the second part 3. The second part 3 is arranged at the first part 2, and is arranged horizontally translationally slideable between the first position, shown in FIG. 1, and the second position, shown in FIG. 2.

Figure 2:
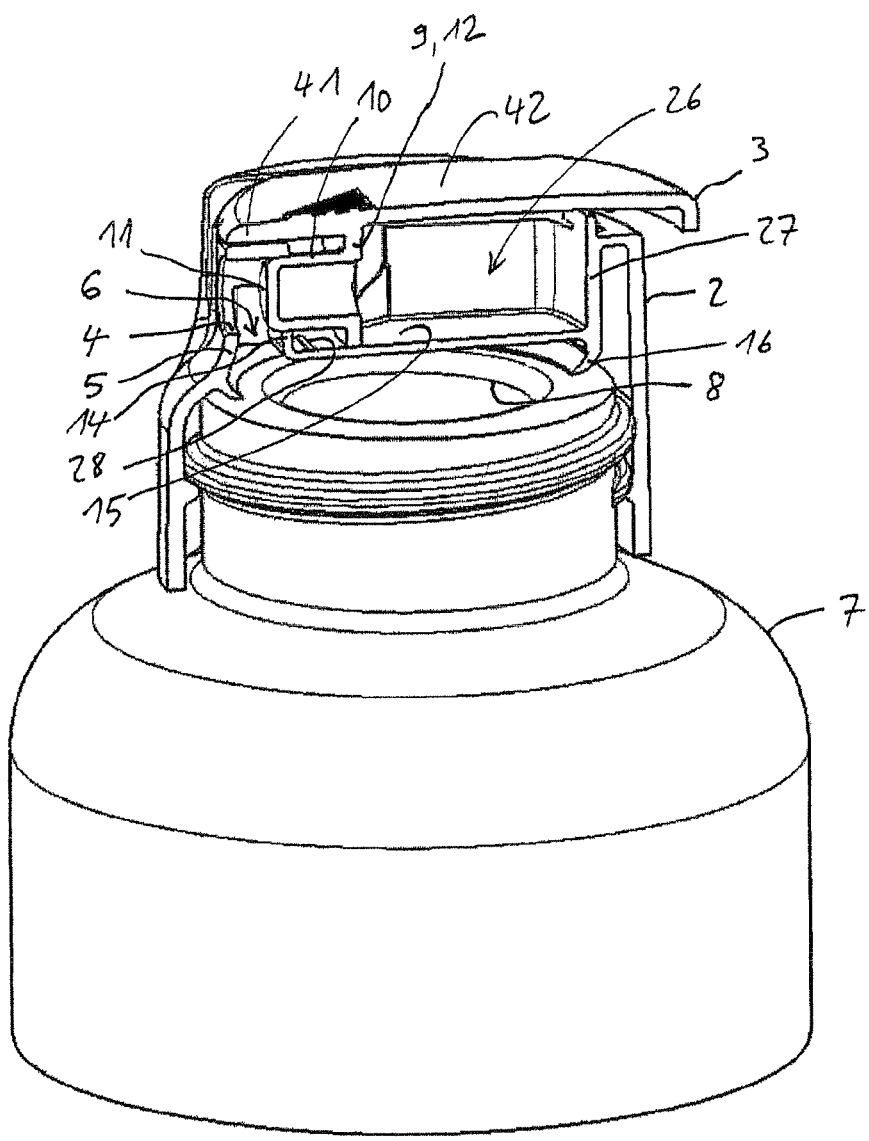
FIG. 2 shows the closure from FIG. 1 in its second position.

As shown in FIG. 2, the first part comprises an outlet opening 4 as well as an outer wall 5, which limits a first cavity 6 outwards. The outlet opening 4 comprises a circular cross section and is arranged vertical, i.e. with horizontal normal vector and, thus, vertically, i.e. 90° to the direction of motion of the second part 3 at the first part 2. In said second position, which is shown in FIG. 2, the outlet opening is opened completely. Product can pour out from the container 7 through the container opening 8, through the first cavity 6 and through the outlet opening 4.

As shown in FIG. 2, the second part comprises a carrier section 9, which comprises a closing plug 10. In FIG. 2, therefore, in the second position of the closure 1, said carrier section 9 is arranged at least partially in the first cavity 6, such that it is protected very well against contamination from outside. In the first position of the closure, shown in FIG. 1, the closing plug 10 engages the outlet opening 4 such that the closing surface 11 of the closing plug 10 seals the outlet opening of the first part 2.

The closing surface 11 of the closure 1 is that surface of the closing plug 10, which projects outwards from the outlet opening, in FIG. 1. It is substantially only said area of the closing plug 10, which is exposed to the environment in said first position. Between said first and said second position of the closure, which is shown in FIG. 2, said closing surface 11 is arranged completely within said first cavity, into which the product enters from the container opening 8 and which it leaves through the open outlet opening 4. During said process, contaminants, which are located at the closing surface 11 and which are, possibly, dissolvable, are flushed out from the inside of the container to the outside. Because the second part 3 is pushed back in the position 1 of FIG. 1, immediately after use of the container by the consumer the closing surface 11 is arranged in the first cavity of the first part only during the short opening phase. During the longer period of the closing phase, the closing surface 11 is, in contrast, turned outwards such that the closure inside and container inside are protected against possible contamination.

Figure 3:
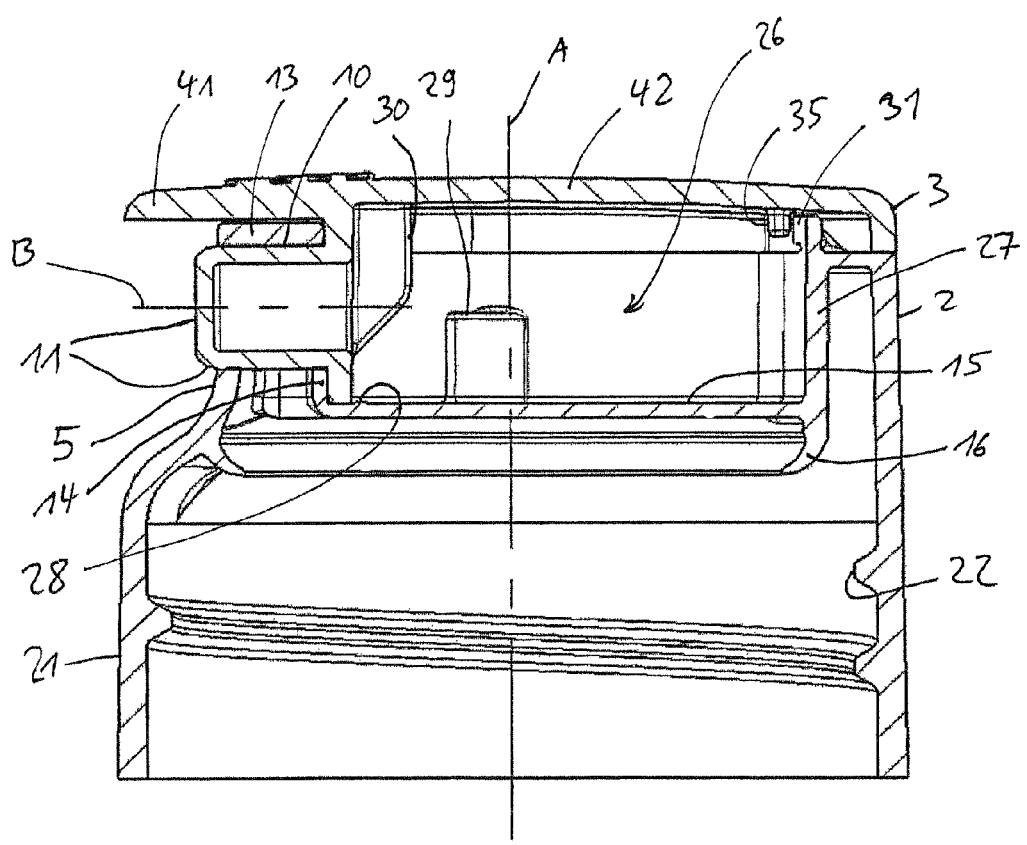
FIG. 3 is a merged cross section view and preview of the closure of FIG. 1.
Figure 4:
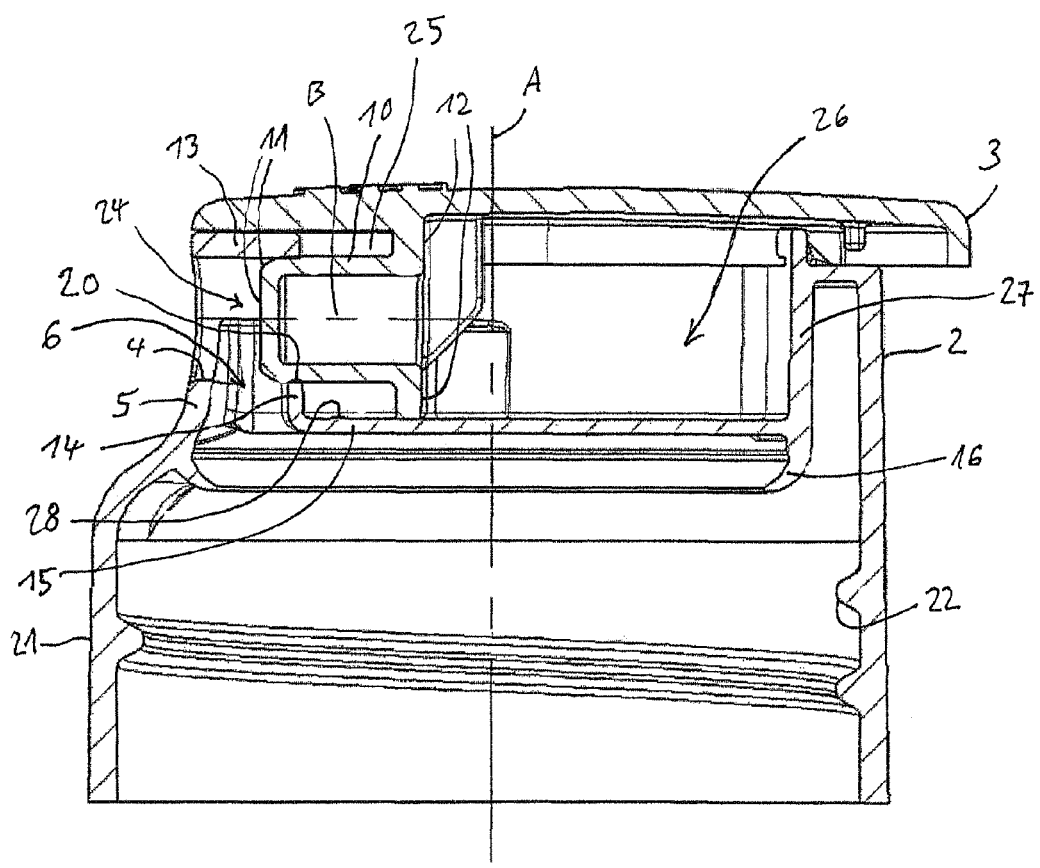
FIG. 4 is a merged cross section view and preview of the closure of FIG. 2.
Figure 5:
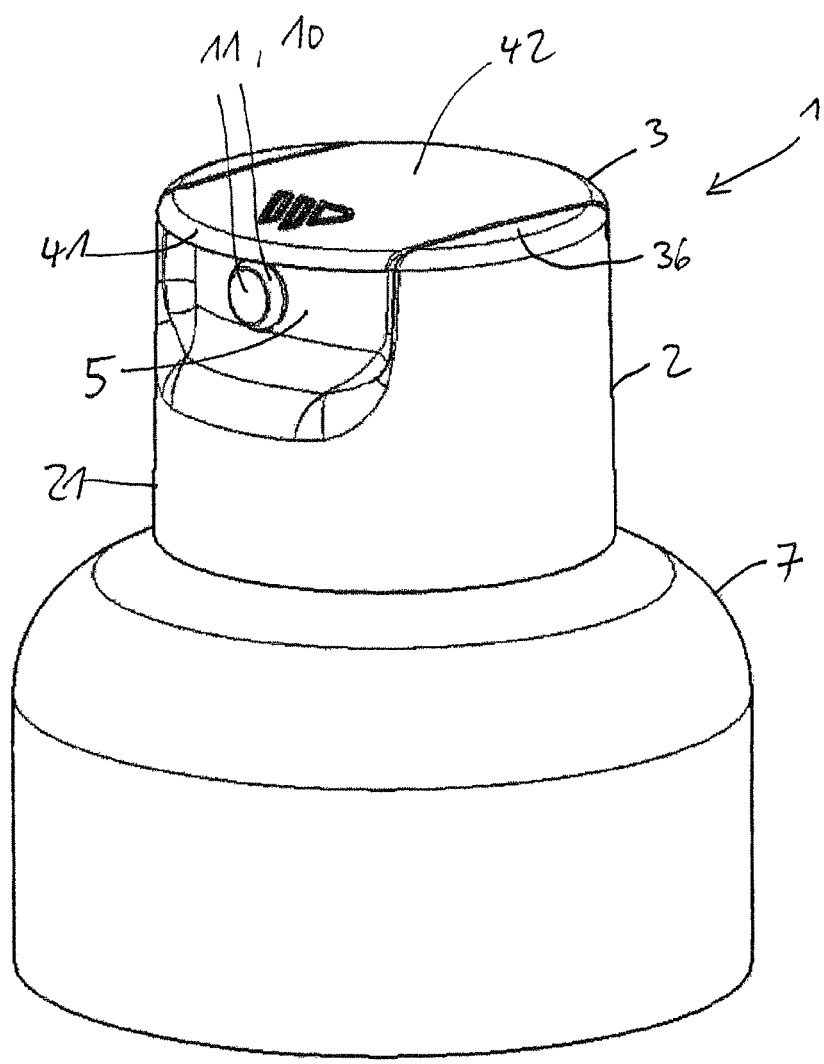
FIG. 5 is a perspective view of the closure of FIG. 1.
Figure 6:
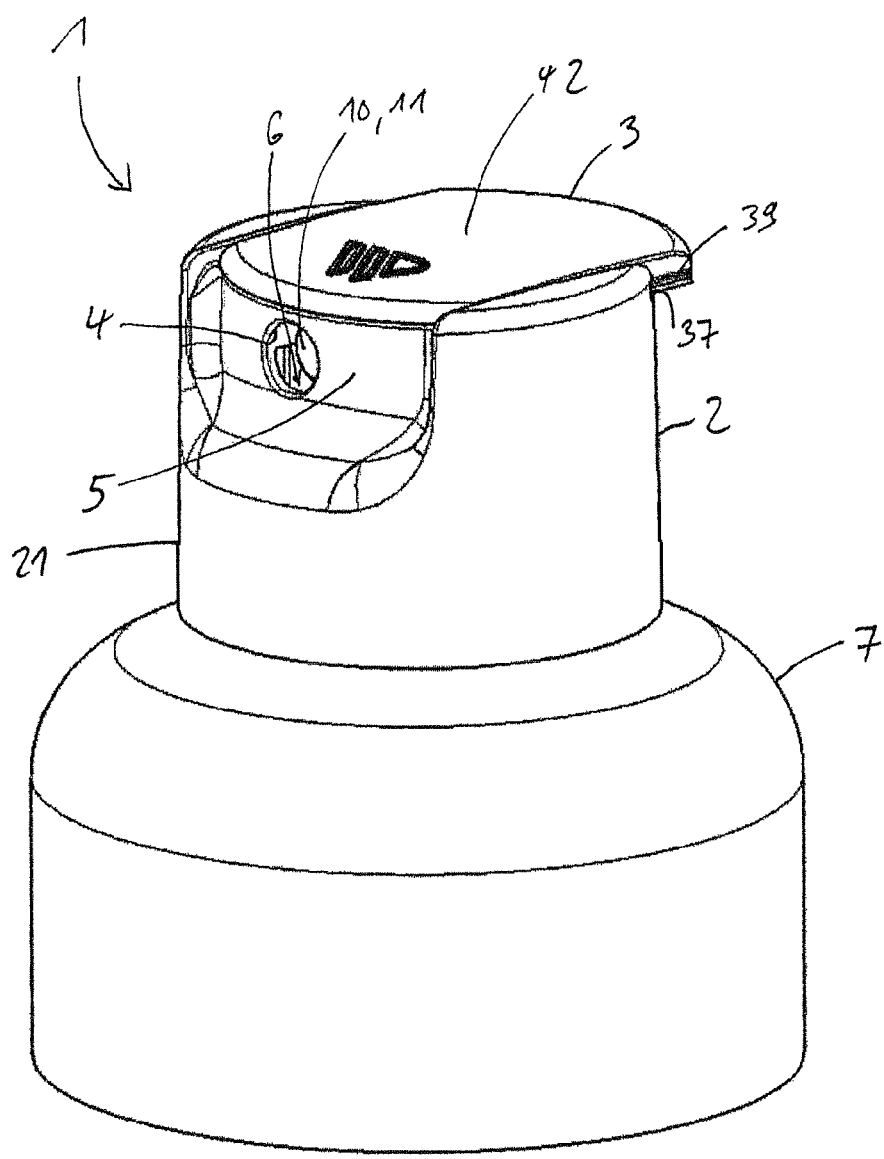
FIG. 6 is a perspective view of the closure of FIG. 6.

As shown in FIGS. 3 and 4, the carrier section 9 comprises a wall 12, which runs vertically through the closure with regard to the vertical line A, wherein the closing plug 10 extends, starting from said wall, in the direction of the outlet opening, along the horizontal direction of motion B of, is the closing plug being formed symmetrically with respect to said direction of motion.

The first part 2 comprises the first cavity 6, whose volume is held small by different constructive features. The first cavity 6 is confined, as shown in FIG. 4, by the outer wall 5, the horizontal head wall 13, the side walls 43 (FIG. 7), the vertical wall 14, which merges into the horizontal wall 15, which, above the container opening, nearly extends over the whole cross-sectional area of the latter and borders the sealing section 16. As can be derived from FIG. 1, the sealing section 16 lies flat in the horizontal plane of the upper border of the container opening 8 on the head wall 17 of the container neck 18. This plane limits said first cavity of the first part from the bottom side.

Figure 7:
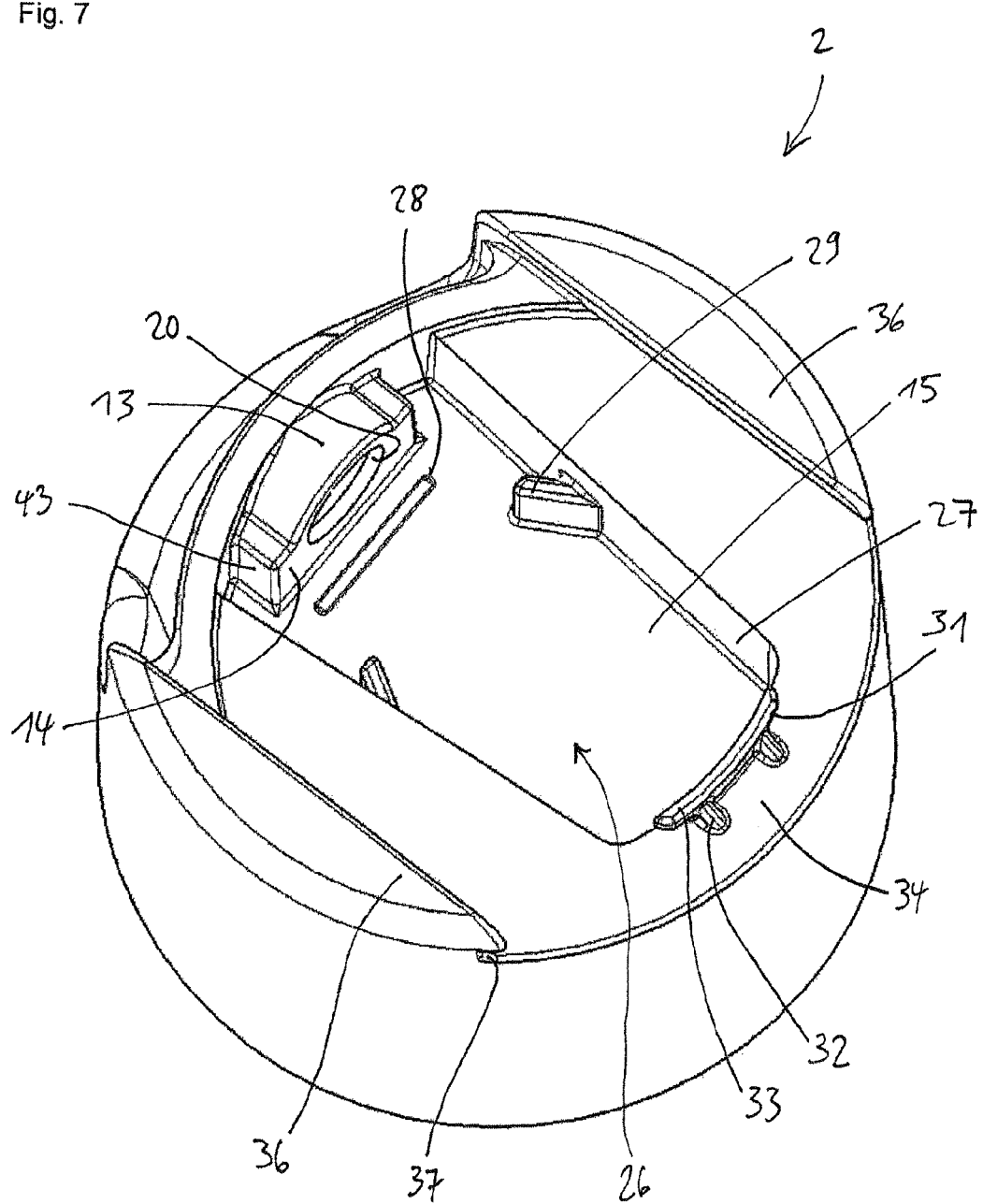
FIG. 7 is a perspective view of the first part of the closure of the FIGS. 1-6.

Like it is further shown in FIG. 7, the volume of the first cavity 6 near the outlet opening is confined, further, in addition by the formation of an outlet chamber, which is formed by the both side walls 43, which are lateral to wall 14 comprising the outlet opening, the wall 14 and the head platform 13. The length of the walls 43, i.e. the horizontal distance of the vertical wall 14 to the outer wall 5 of the first part, is calculated in such a way that the outlet channel, which is created between these walls, preferably, comprises at least the same cross section as the outlet opening. In this manner the discharge of the product is not hindered not more than necessary, on the one hand, and, on the other hand, the first cavity 6, in particular the space section 24 and said outlet channel in the volume are kept small.

As can be further derived from FIG. 4, the horizontal wall 15 of the first part is arranged immediately above the container opening. The distance between this horizontal wall 15 and the upper border of the container opening 8, which, in FIG. 4, corresponds, substantially, to the lower border of the sealing section 16, is selected, preferably, to be as small as possible. It is preferably smaller than the diameter of the outlet opening, preferably smaller than half of the diameter of the outlet opening.

The amount of the product, which can accumulate in said first cavity 6 near the outlet opening is limited by the low volume of the first cavity 6, in particular by the low volume of said outlet chamber near the outlet opening. If product is sucked back into the container inside, the product possibly already having experienced a certain ageing or contamination near the outlet opening, this amount is limited to a minimum. In this manner the sanitary quality of the closure is further improved.

As it is further shown in FIG. 4, the first part in the vertical wall 14 comprises an engagement opening 20, into which the closing plug 10 engages in said first and in said second position. The engagement opening 20 and the external diameters of the closing plug 10 are calculated in such a way that the form-fitting engagement of the closing plug seals the engagement opening in said first position, as well as in said second position. This is possible in particular by the choice of the material of the closure, presently polypropylene. The sealing is, at hand, sufficient to prevent the undesired leakage of a product like a paste or a liquid through the engagement opening 20 during conventional use of the closure. The outlet opening 4 has, here, the same quality as the engagement opening 20 such that the closure is sealed accordingly in said first position.

The closure according to the invention, preferably, comprises a portioning device, by which the amount of the discharging product can be manually portioned in a simple way. The portioning device of the closure 1 encloses said closing plug 10 with said closing surface 11, which can be shifted starting from said first cavity into the direction of the outlet opening 4. During this process, the stream of the discharging product is reduced in a controlled way, because the user can truncate it by a motion of his finger, which pushes the second part to the outlet opening. The truncation of the stream is visible from outside. Compared to a conventional container with a flip-top closure, e.g., for shampoo, where a portioning is possible only via the application of a pressure, the advantage is offered here that portioning is considerably simplified. The use of such a closure and the container provided with it becomes much more comfortable. Said limitation of the volume of the first cavity 6, the outlet channel or the outlet chamber, for hosting the stream of the product, represents a resistance, whereby the product stream velocity is reduced, which further improves the portioning. As shown in FIG. 4, the first part comprises a hollow cylinder section 21, which is provided with a fastening device for the attachment of the closure at a container 7. Shown also in FIG. 1, said fastening device comprises a thread 22 at the inside of the hollow cylinder section 21 of the first part, which is connectable with the outside thread 23 at the container neck 18 of the container 7 such that the first part of the closure is fastenable at the container. During the screwing on the first part onto the container neck the sealing section 16 is pressed against the head wall 17 of the container neck 18. Said sealing section 16 is formed as a sealing lip, which is elastic deformable. By firmly screwing of the first part to the container neck, a tensioning of the first part against the outside thread 23 is reached, inter alia, by the deformation of the elastic element 16, wherein at the same time the sealing effect of the sealing lip 16 is improved such that said first cavity 6 of the first part is sealed.

As shown in FIG. 4, this first cavity 6 of the first part comprises a space section 24, which is engaged by said closing plug while conveying the closing plug and the closing surface 11 from said second position in the first position. In said second position shown in FIG. 4, the closing plug 10 is arranged such that the closing surface 11 confines said first cavity 6, in particular this space section 24. During closing of the closure, the closing surface 11, in particular said closing plug 10 will urge out that product, which possibly remained within the space section 24 in the direction of the outlet opening 4 and towards outside such that it can run off outside down. The closing plug 10 serves, in the first position shown in FIG. 3, in addition, as a place holder for keeping the space free for the space section 24. Thereby is guaranteed that in this space section 24 no ageing material dries and that the outlet opening or the outlet channel does not become blocked. The comfort and sanitary quality of the closure is thereby further improved.

As shown in FIG. 4, the second part above the closing plug 10 comprises a space 25 in which the head wall 13 of the first part engages. By means of the head wall 13 and by means of the sections forming this space 25 of the second part the second part is guided at the first part. Further, the second part is guided by the engagement of the closing plug into said engagement opening 20 and this outlet opening 4. Further, the underside of the vertical wall 12 of the carrier section 9 slides on the upper side of the horizontal wall 15 of the first part, whereby the second part is guided at the first part.

As shown in FIG. 7, the first part comprises, at both sides of the head platform 34, two lateral head platforms 36, each of them being undercut by a gap 37. This gap 37 serves as a guide rail for the bevelled fringe 39 of the second part shown in FIG. 8. In this manner a comfortable sliding motion of the second part at the first part is achieved, which simplifies, in particular, the one-handed operability of the closure.

As shown in the FIGS. 4 and 7, the first part 2 comprises a second cavity 26. The cavity 26 is confined by the head platform 13, the vertical walls 14 and 43, the horizontal wall 15 and the vertical wall 27 of the first part, as well as by the second part 3. This second cavity 26 is shielded outwards, in particular, in this first, closed position of the closure. Thereby it is prevented that impurities can penetrate into this second cavity during the relatively long storage time (closing time) of the container. Within said second cavity 26 is arranged largest said carrier section 9, 10, 12, in this second position, which is shown in FIG. 4. Further, other functional elements of the closure are arranged within this second cavity 26.

As shown in FIG. 7, said first part 2 comprises in the second cavity 26 at the upper side of the horizontal wall 15 of the first part a projection bead 28. This projection bead 28 serves as a threshold for the glide over of the lower border of the vertical wall 12 of the carrier section 9 of the second part. If, like shown in FIG. 3, this lower border is arranged on the vertical wall 12 of the carrier section between this projection bead 28 and the vertical wall 14, it is necessary, for conveying the closure into this second position, that the user raises an opening force, which lets the lower fringe of the vertical wall 12 of the carrier section glide over said opening bead 28. Therefore, said first position is predetermined by means of the projection section 28. Further, stopper elements 29 are arranged in this cavity 26, which co-operate with the stopper elements 30 (FIG. 8) of the second part 3. During the opening of the closure, these stopper elements 30 of the second part once bump against the stopper elements 29 of the first part 1, the sliding of the second part at the first part is stopped and the closure is therefore positioned in said second position. The stopper elements 30, in addition, contribute to the stiffening and stabilisation of the carrier section 9,12, by preventing the bending of the wall 12. Therefore, the reliability of the closure is further improved.

Figure 8:
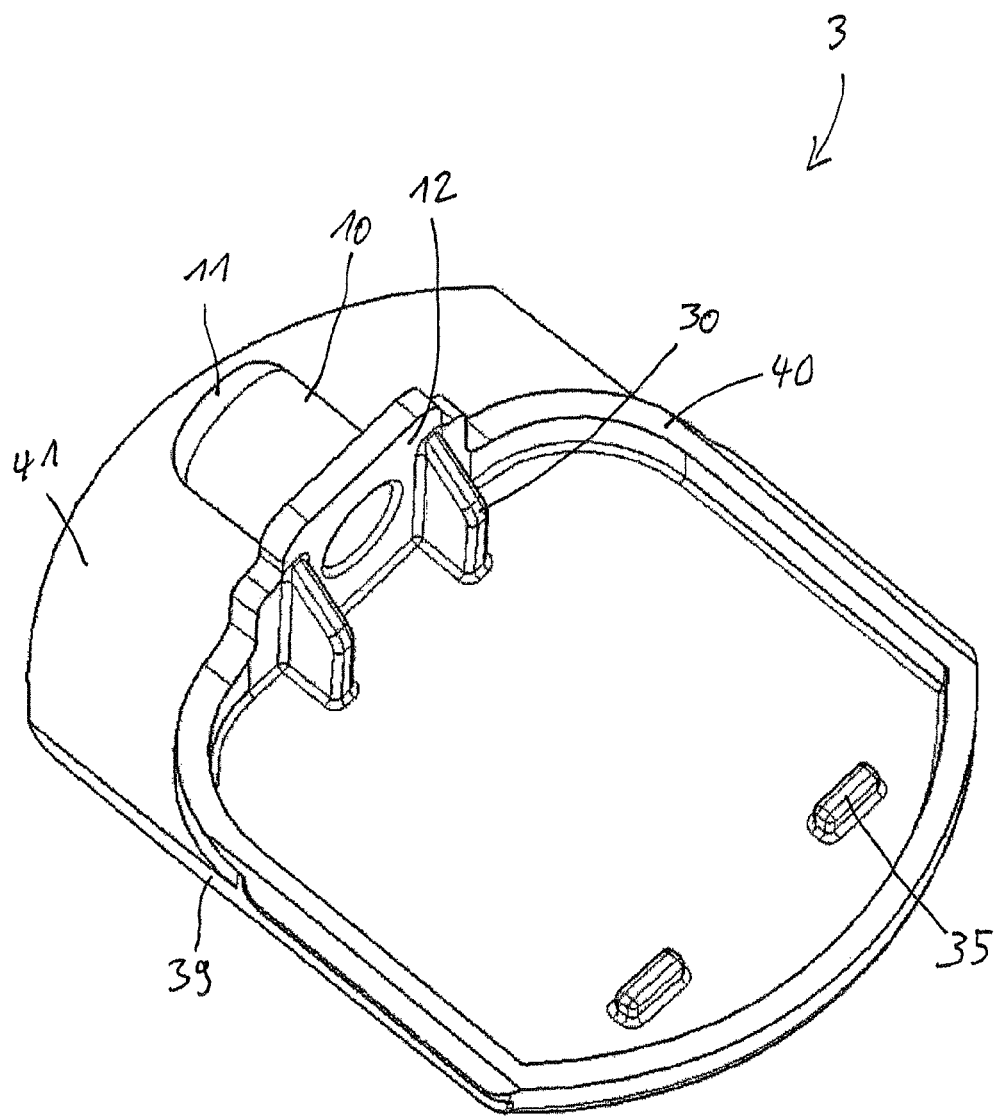
FIG. 8 is a perspective bottom view of the second part of the closure of the FIGS. 1-6.

Further shown in FIG. 8, the vertical wall 12 of the carrier section 9, which carries the closing plug 10 with the closing surface 11, merges into the circumferential border section 40, which covers and seals said second cavity 26 upwards, in said first position.

Like it is shown in FIG. 7, the closure comprises a signalling device, which signals the transfer of said second part at the first part, from the first position into the second position and back, to the user, acoustically and by vibration The signalling device comprises a vibration element 31, which is shown in FIG. 7. The vibration element 31 comprises two foot elements 32, which are connected with the head wall 34 of the first part and which carry the vibration bridge 33. The second part 3 comprises two actuating elements 35, which deflect and release the external ends of the swinging bridge 33 upon the change between said first position and said second position and, therefore, stimulate said vibration bridge 33 to vibrate. The vibration generates a tactile perceptible vibration of the closure, accompanied by a noise, which clearly signals the change between this first and this second position to the user. In this manner the ease of use of the closure is enhanced.

Further the second part 3 comprises, as shown in FIG. 8, a shield element 41, which covers the area of the outlet opening and, in particular, said closing surface 11 upwards, in said first closed position of the closure, like it is shown in FIG. 3. In this manner a contamination by dropping contaminants of the closing surface 11 is prevented in this first position.

Figure 9A:
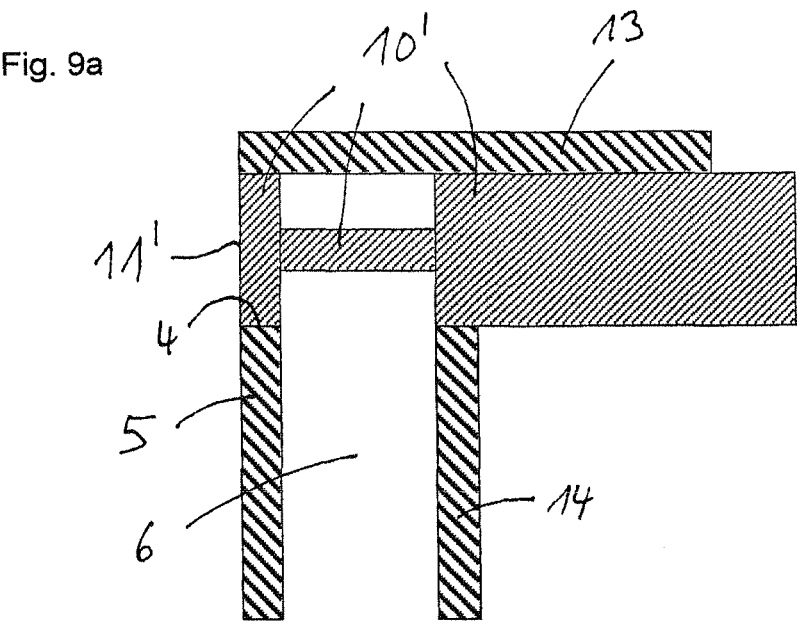
FIGS. 9a and 9b relate to a modification according to the invention of the embodiment of the closure according to the invention of the FIGS. 1 to 8 and show a section of the closure near the outlet opening, in the first position (FIG. 9a), and the second position of the sealing (FIG. 9b).
Figure 9B:
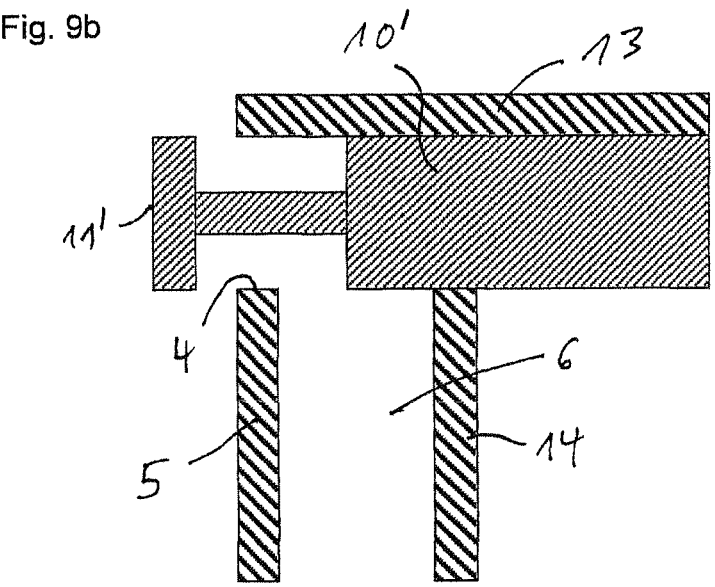

FIGS. 9a and 9b relate to a modification of the embodiment according to the invention of the closure according to the invention of the figures from 1 to 8 and show in the cross section a sub section of the closure near the outlet opening in the first position (FIG. 9a) and in the second position of the closure (FIG. 9b). In FIG. 9a, the closing plug 10' with the closing surface 11' is shown, which seals the outlet opening 4, in the first position, and is exposed to the outside area, in this position. In FIG. 9b, the closing plug 10' with the closing surface 11' has been moved to the left via the second part, not shown, such that the outlet opening is opened, but is, due to constructional conditions, partially taken by the closing plug 10', which engages the outlet opening. The closing plug is cleaned by the stream of discharging product such that the first cavity 6 is exposed, in the first position, to a cleaned closing plug, which makes the use of the closure more hygienic.

Figure 10A:
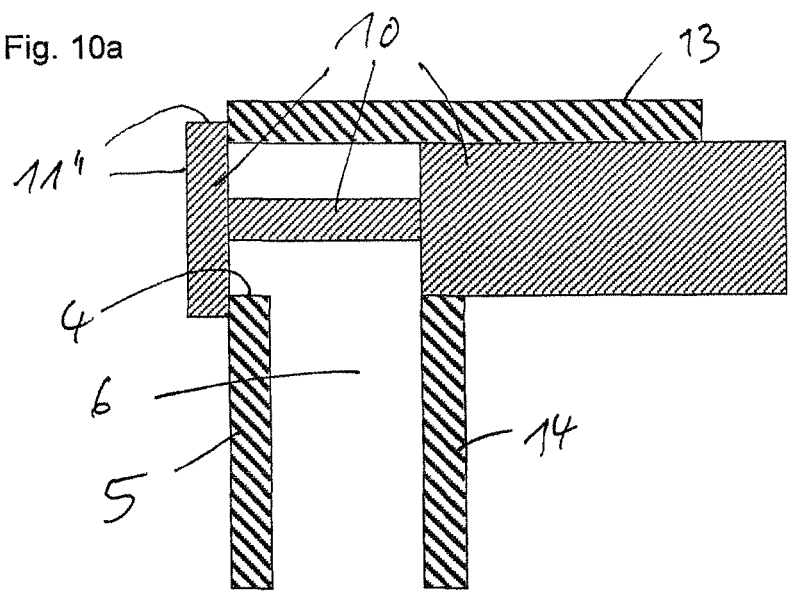
FIGS. 10a and 10b relate to a modification according to the invention of the embodiment of the closure according to the invention of the FIGS. 1 to 8 and show a section of the closure near the outlet opening, in the first position (FIG. 10a), and the second position of the sealing (FIG. 10b) modification.
Figure 10B:
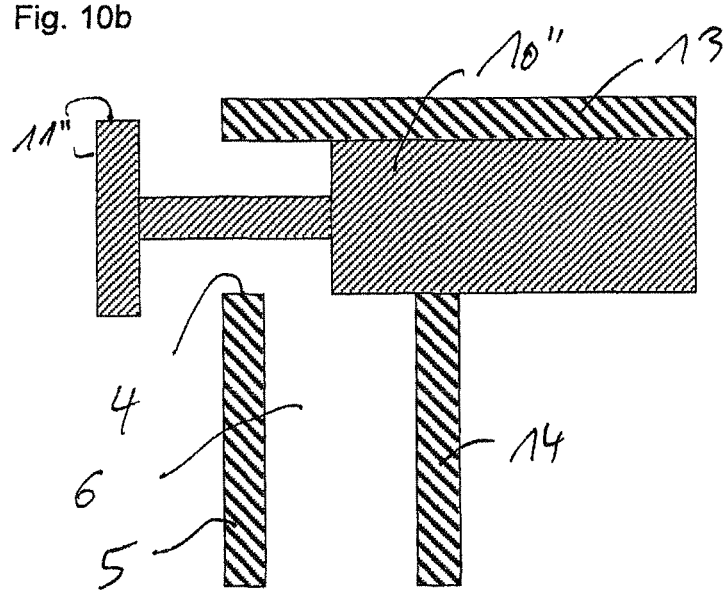

FIGS. 10a and 10b relate to a modification according to the invention of the embodiment of the closure according to the invention of the FIGS. 1 to 8 and show a section of the closure near the outlet opening, in the first position (FIG. 10a), and the second position of the sealing (FIG. 10b). The modification of FIG. 10a, b equals that of FIG. 9a, b. The closing plug 10" with the closing surface 11" is arranged, in said first position (FIG. 10a), partially outside of the first cavity 6 and the first part of the closure.

The closure 1 is made completely from polypropylen, while said first part and said second part are injection moulded each integrally and are joined in another step. By the choice of said material, in particular, it is possible to dimension the outlet opening and the intervention opening in such a way that an accordingly dimensioned closing plug seals said openings sufficiently against the leakage of products like a fluid or like a paste. Other materials are still possible. Further, the narrow construction of closure 1, in particular the low height of this first cavity 6 below the horizontal wall 15 of the first part, and the arrangement of various functional elements within the cavities of the closure offer the advantage that the closure can be manufactured while using a relatively low amount of material, only, and can be produced, therefore, low-cost.

What is claimed is:

1. Sliding Closure for a container, in particular for a fluid product, with a first part having an outlet opening, the outlet opening being arranged in a side wall of the first part, and
   with a second part having a carrier section, which carries a closing surface,
   wherein said first part and said second part are arranged movably against each other at least between a first position and a second position,
   and wherein, in said first position, said outlet opening is closed by said closing surface, while, in said second position, the outlet opening is open,
   wherein the first part confines a first cavity, through which the product can be transferred out of the container to the outlet opening and
   said carrier section, in said second position, is arranged at least partially within said first cavity,
   wherein the first part has a second cavity, in which said carrier section is arranged at least in part in said second position,
   and wherein the second part comprises a lid section, which is formed such that it covers, in said first position and said second position, the first part partially upwards and covers said second cavity upwards, and
   wherein the second part comprises a shield element located above the outlet opening, which is integrally formed with the second part and which, in the first position, radially protrudes beyond the outlet opening and closing surface.

2. Sliding Closure according to claim 1, characterized in that the first part has an engagement opening, into which the carrier section engages in said first position, preferably also in said second position.

3. Sliding Closure according to claim 1, characterized in that the carrier section is configured in a manner, such that the carrier section extends at least in part symmetrically with respect to an uniform path of motion, along which the first and the second part are moved relative to each other between the first and second position.

4. Sliding Closure according to claim 1, characterized in that said carrier section engages said outlet opening in said first position.

5. Sliding Closure according to claim 1, characterized in that the closing surface confines the first cavity in said second position.

6. Sliding Closure according to claim 1, characterized in that a holding device is provided, by means of which the first and second part are held undetachable together.

7. Sliding Closure according to claim 1, characterized in that the closure includes a guiding device, by which the first and the second part are guided, while they are moved between the first and second position relative to each other.

8. Sliding Closure according to claim 1, characterized in that the first part and the second part are translationally movably against each other.

9. Sliding Closure according to claim 1, characterized in that the outlet opening is arranged at least partially in a plane, which is inclined and/or which is, in particular, essentially vertical, with respect to a direction of motion, along which the first and the second part are moved with respect to each other between the first and second position.

10. Sliding Closure according to claim 1, characterized in that the carrier section comprises a closing plug.

11. Sliding Closure according to claim 1, characterized in that, the closure comprises a signalling device, which signals the change of said first and said second position to the user, in particular, by acoustically, visually or tactile perceptible signals.

12. Sliding Closure according to claim 1, characterized in that a positioning device is provided, by which the second part is detachably held in a certain position.

13. Sliding Closure according to claim 1, characterized in that the closure is one-hand operable.

14. Container, which is equipped with a closure according to claim 1.

15. Sliding Closure according to claim 1, characterized in that the first part comprises a head platform and two lateral head platforms, each of them being undercut by a gap, which serves as a guide rail for guiding the sliding motion of the second part at the first part.

* * * * *